UNITED STATES PATENT OFFICE.

PEPPINO MAJORANA, OF LOUISVILLE, KENTUCKY.

PYROXYLIN COMPOSITION.

1,275,063.      Specification of Letters Patent.      Patented Aug. 6, 1918.

No Drawing.      Application filed May 15, 1918. Serial No. 234,811.

*To all whom it may concern:*

Be it known that I, PEPPINO MAJORANA, a subject of the King of Italy, residing at Louisville, in the county of Jefferson and State of Kentucky, have invented new and useful Improvements in Pyroxylin Compositions, of which the following is a specification.

This invention relates to a new composition of matter, comprehending the provision of a composition of matter designed particularly for use in the manufacture of transparent or translucent sheet materials.

The primary object of the invention is to provide a composition of matter whereby a sheet of material of that kind having a pyroxylin base may be manufactured in such a manner as to produce a film or other sheet substance which is exceedingly strong, tough and durable.

A further object of the invention is to provide a sheet material of the character defined which may be of any desired degree of transparency, and which, by reason of its strength, durability and toughness, is of great value in the manufacture of photographic films, ribbon or tape phonographic records and the like.

The improved composition consists of the following ingredients combined in about the stated proportions, to wit:

| | |
|---|---|
| Clear collodion | 80.5%; |
| Spirits of camphor | 6.5%; |
| Gum camphor | 10.5%; |
| And a suitable vegetable or mineral dye | 2.5%. |

These ingredients are placed in a suitable receptacle and thoroughly mixed until the camphor gum has dissolved and the dye thoroughly commingled with the mass, and all of the constituents are properly blended together. The mixture is then poured upon a slab for the production of the film or sheet material of a desired thickness, or any other suitable way of forming the film or sheet therefrom may be employed. The sheet or film may then be properly trimmed or shaped according to the purpose for which it is to be used, or otherwise treated to suit any particular and specific character of film or article which is to be made therefrom.

In practice, the proportions of the several ingredients is found to be desirable and highly satisfactory. The proportions may, however, be varied to certain degrees. For instance, from 75% to 85% of the collodion may be used, and the proportions of the spirits of camphor may vary from 5.5% to 7.5%, and of the camphor gum from 8% to 10.5%, as circumstances may require or as it may be found best suitable in the production of films or sheets for different purposes. The amount of the dye used may vary, according to the character or color of the dye, and according to the desired degree of tint, the amount named being the approximate amount generally used.

In this composition, the spirits of camphor serves to give strength and toughness to the pyroxylin, while the camphor gum gives tenacity and flexibility. The effect of these ingredients upon the collodion is, accordingly, to provide a film or sheet which is highly flexible, strong, tough and durable, and which, unlike ordinary celluloid films, is not easily cracked or torn.

The function of the dyeing agent in this composition, a diamond blue dye being ordinarily employed, is to clarify the mixture and to increase its transparency, as well as to give uniformity of color and a clear effect. While a blue dye is preferably employed for this purpose, it is, of course, to be understood that orange or other colored dyes may be used to give a proper clarifying action as well as a tint or color effect, and to make the tint or color uniform throughout the film or sheet.

A film or sheet of material produced from my improved composition of matter may be employed for a wide variety of purposes, and hence the invention is not limited in this respect. On account, however, of the great strength, durability and toughness of the product, it is especially useful in the production of photographic films, and also for the production of phonographic records of the ribbon or flexible strip type. In making a ribbon or flexible record from this material, the phonographic record groove or grooves are formed in the record groove while it is still in a plastic state and material before it hardens, after which the ribbon may be treated to an additional hardening bath, if desired. By the use of a phonographic record of this material, any number of sound record grooves, from one to twenty-five, may be formed in one or both sides of the ribbon, without liability of weakening the ribbon, owing to the strength and toughness of the material. The ribbon may also be made of any desirable length, thus allowing a large number of records of any length to be formed upon a single ribbon.

Having thus fully described my invention, I claim:

1. A composition of matter for the purpose described including pyroxylin, from 75 to 85%, spirits of camphor, from 5.5 to 7.5% and camphor gum from 8 to 10.5%.

2. A composition of matter comprising pyroxylin, about 80%; spirits of camphor, about $6\frac{1}{2}$%; gum camphor, about $10\frac{1}{2}$%; and a suitable clarifying and tinting dye, about $2\frac{1}{2}$%.

3. A composition of matter comprising pyroxylin, about 80%; spirits of camphor, about $6\frac{1}{2}$%; gum camphor, about $10\frac{1}{2}$%; and a suitable blue dye, about $2\frac{1}{2}$%.

4. A composition for the purpose described comprising pyroxylin from 75 to 85%, spirits of camphor from 5.5 to 7.5%, camphor gum from 8 to 10.5%, and a suitable proportion of a clarifying and tinting dye.

In testimony whereof I affix my signature.

PEPPINO MAJORANA.